United States Patent
Antony

(10) Patent No.: US 9,294,407 B2
(45) Date of Patent: Mar. 22, 2016

(54) NETWORK DEVICE LOAD BALANCING IN A VIRTUALIZED COMPUTING ENVIRONMENT

(71) Applicant: VMware, Inc., Palo Alto, CA (US)

(72) Inventor: Jinto Antony, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 295 days.

(21) Appl. No.: 13/927,130

(22) Filed: Jun. 26, 2013

(65) Prior Publication Data

US 2015/0006705 A1   Jan. 1, 2015

(51) Int. Cl.
- G06F 15/173 (2006.01)
- H04L 12/803 (2013.01)
- H04L 29/08 (2006.01)
- H04L 12/26 (2006.01)

(52) U.S. Cl.
CPC ........ H04L 47/125 (2013.01); H04L 29/08144 (2013.01); H04L 29/08288 (2013.01); H04L 43/0882 (2013.01); H04L 67/1036 (2013.01); H04L 67/1038 (2013.01)

(58) Field of Classification Search
CPC .............. H04L 47/125; H04L 43/0882; H04L 29/08144; H04L 29/08288; H04L 67/1036; H04L 67/1038; H04L 12/2692; H04L 43/16
See application file for complete search history.

(56) References Cited

U.S. PATENT DOCUMENTS

| | | |
|---|---|---|
| 8,102,781 B2 | 1/2012 | Smith |
| 2009/0055507 A1 | 2/2009 | Oeda |
| 2010/0161922 A1 | 6/2010 | Sharp et al. |
| 2012/0036515 A1 | 2/2012 | Heim |
| 2012/0066371 A1* | 3/2012 | Patel et al. ..................... 709/224 |
| 2012/0210416 A1* | 8/2012 | Mihelich et al. ................ 726/11 |
| 2013/0054813 A1 | 2/2013 | Bercovici et al. |
| 2013/0104128 A1 | 4/2013 | Kurita |
| 2013/0301413 A1* | 11/2013 | Moen et al. .................... 370/235 |
| 2014/0040886 A1 | 1/2014 | Boukharov et al. |

* cited by examiner

Primary Examiner — Krisna Lim

(57) ABSTRACT

Techniques for balancing network load at network devices in a virtualized computing environment are disclosed. In one embodiment, a first network device having network load above a threshold value is determined. Further, a first host coupled to the first network device is identified. The first host executes a workload that transmits and receives network traffic via the first network device. If the first host is not coupled to any other network device, the network load at the first network device is reduced by initiating migration of at least a part of the workload to a second host coupled to any other network device. If the first host is coupled to a second network device, the network load at the first network device is reduced by instructing a virtual switch of the first host to route at least a part of the network traffic between the workload and second network device.

22 Claims, 6 Drawing Sheets

NETWORK DEVICE LOAD BALANCING IN A VIRTUALIZED COMPUTING ENVIRONMENT

TECHNICAL FIELD

The present disclosure relates to methods, techniques, and systems for network resource management in a virtualized computing environment and, more particularly, to methods, techniques, and systems for network load balancing in the virtualized computing environment.

BACKGROUND

Computer virtualization is a technique that involves encapsulating a representation of a physical computing machine platform into a virtual machine (VM) that is executed under the control of virtualization software running on hardware computing platforms (also referred to herein as "hosts" or "host computing systems"). A group of hardware computing platforms may be organized as a cluster to provide hardware resources for VMs. In a data center, it is common to see multiple network switches and multiple VMs running on multiple clusters of hosts with each host coupled to at least one of the multiple network switches. Typically, in the data center, multiple VMs are migrated between the host computing systems, which may result in unbalanced network traffic. In this case, some network switches can be overloaded and some can be underutilized.

Figure 1:
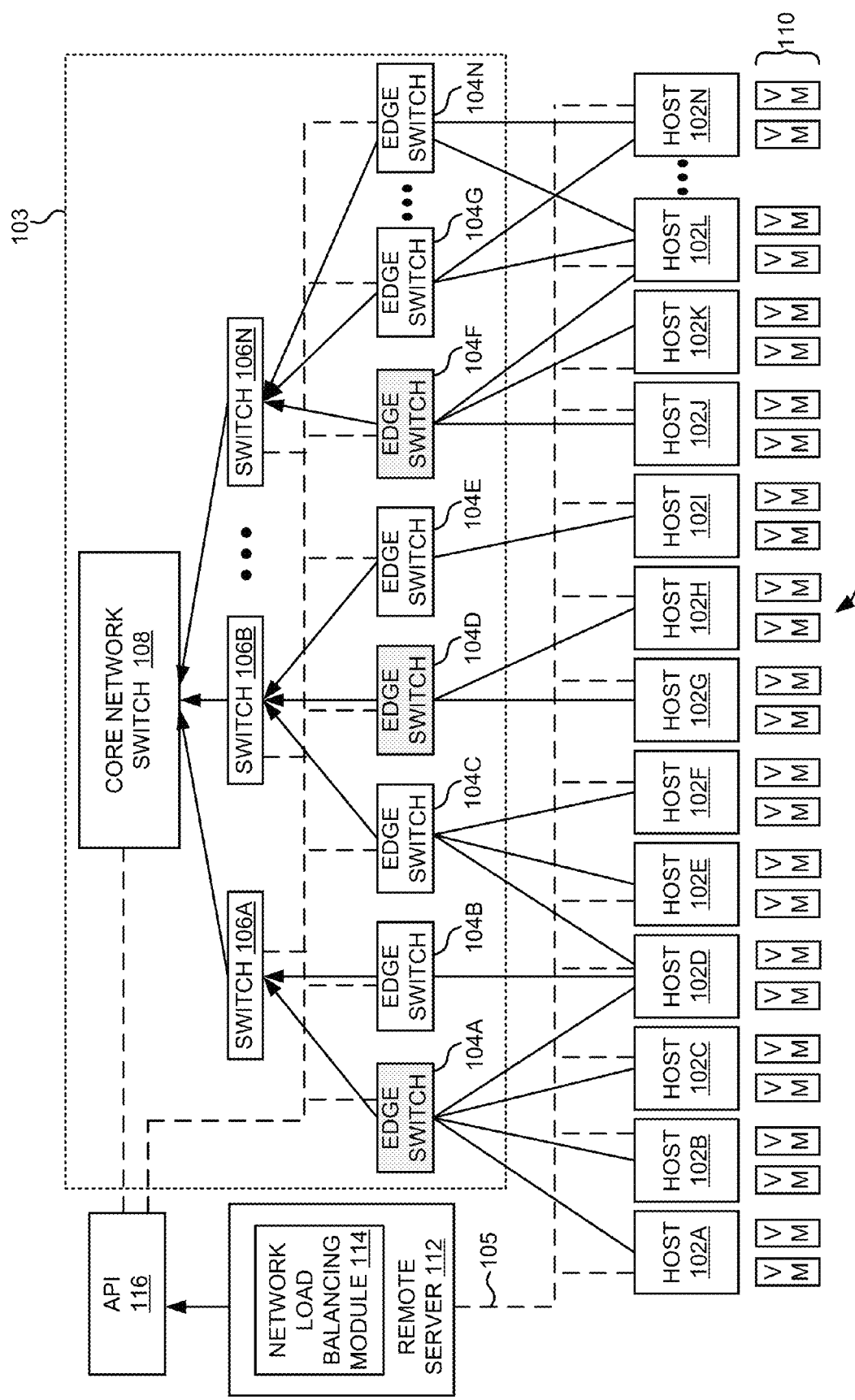
FIG. 1 is an example system view of a virtualized computing environment illustrating a network load balancing module to determine network switches having network traffic above a threshold value.

The drawings described herein are for illustration purposes only and are not intended to limit the scope of the present subject matter in any way.

DETAILED DESCRIPTION

Embodiments described herein provide enhanced computer-based and network-based methods, techniques, and systems for balancing network load at network devices (e.g., network switches) in a virtualized computing environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

The term "virtualized computing environment" is used herein to refer to a physical infrastructure that hosts a virtual infrastructure comprising virtual objects, such as virtual machines (VMs), virtual data centers (VDCs), and virtual appliances (vApps). The term "network switch" is used in the following description, however, in the present invention it is used broadly to refer to any network device capable of routing/carrying the network traffic, such as routers, switches, multi-function devices having a routing function, edge gateways, and so on.

The present technique provides a network load balancing module that determines a network switch having network load above a threshold value. Further, the network load balancing module identifies a host computing system coupled to the network switch. In this case, the identified host computing system executes a workload that transmits and receives network traffic via the network switch. Furthermore, the network load balancing module reduces the network load at the network switch by dynamically routing at least a part of the network traffic passing through the network switch through other network switches. This can be achieved by instructing a virtual switch associated with the identified host computing system to route the part of the network traffic between the workload and the other network switch and/or dynamically initiating migration (e.g., live migration) of at least a part of the workload (e.g., one or more VMs) to other host computing system coupled to other network switch based on a network topology map and network traffic at the other network switches. The term "network topology map" refers to a map showing the relationships/connections between the network switches, host computing systems and workloads in the virtualized computing environment. For example, the network topology map is used to determine the interconnections between the network switches and the host computing systems.

In one example embodiment, if the identified host computing system is coupled to the other network switch, the virtual switch is instructed to route some of the network traffic between the workload and the other network switch. In this case, the workload of the identified host computing system is connected to a different physical network port that is connected to the other network switch. If the identified host computing system is not coupled to any other network switch, migration of the part of the workload to other host computing system coupled to any other network switch is initiated. This process is repeated for other host computing systems coupled to the network switch until the network load at the network switch falls below the threshold value. In one example embodiment, a resource scheduling framework can manage selection of network switches to route some of the network traffic and selection of host computing systems to migrate part of the workload.

As used herein, the term "balanced" means that network traffic at all network switches of interest is below a threshold value. The use of the term "balanced" should not be interpreted as meaning that levels of network traffic are equal. For example, if one network switch carries twice the network traffic of another network switch, the network traffic is considered to be balanced as long as both network switches are carrying traffic below the threshold value.

FIG. 1 is an example system view 100 of a virtualized computing environment illustrating network load balancing module 114 to determine network switches having network traffic above a threshold value. Those skilled in the art will recognize that it might be desirable to define a different threshold value for different network switches. For example, a newer generation network switch may be able to carry more network traffic than an older generation network switch. Also, it may be desirable to vary the threshold value in response to overall network traffic levels.

In the example shown in FIG. 1, the virtualized computing environment includes network fabric 103 showing various network switches that are configured in a hierarchical model (i.e., edge switches 104A-N in a first level, switches 106A-N in a second level, and core network switch 108 in a third level) and their connections. Further, the virtualized computing environment includes host computing systems 102A-N and remote server 112. Each host computing system 102A-N may have one or more virtual machines (VMs) 110 running therein. Furthermore, host computing systems 102A-N are coupled to associated network switches 104A-N at the first level, which in turn connected to associated network switches 106A-N at the second level.

Remote server 112 includes network load balancing module 114. One skilled in the art can appreciate that network load balancing module 114 can also be provided in a VM or virtual application that can run on any host computing system and can be provided to a user through a graphical user interface as a part of management software. In operation, network load balancing module 114 obtains network traffic and a network topology map associated with the network switches using API 116. The network topology map here refers to a map showing the relationships between the network switches, host computing systems 102A-N and VMs 110 in the virtualized computing environment.

In one embodiment, network load balancing module 114 determines the network traffic at each network switch 104A-N by measuring network traffic at each virtual switch associated with host computing systems 102A-N (e.g., using connection 105 between network load balancing module 114 and host computing systems 102A-N) and then summing the network traffic at each virtual switch connected to each network switch 104A-N using the network topology map. For example, the network traffic at the network switch 104A is determined by summing the network traffic at virtual switches of host computing systems 102A-D, provided that host computing systems 102A-D executing workloads that transmit and receive network traffic via the network switch 104A.

In another embodiment, the network traffic at each port of a network switch is determined using an application programming interface (API). Note that a generic block representing API 116 is shown in FIG. 1 for discovering network topology maps and monitoring network statistics, including network traffic at each port of a network switch. However, those skilled in the art will recognize that each managed network switch will have an API that facilitates access to management and monitoring functions. For example, API 116 may implement an industry standard protocol, such as a simple network management protocol (SNMP), in conjunction with a remote monitoring standard, such as remote network monitoring (RMON). RMON versions 1 and 2 provide for monitoring many network attributes, including port utilization, bytes/frames sent/received, collisions, cyclic redundancy check (CRC) errors, traffic statistics for each protocol, and the like. RMON also provides for alarms to be generated based on a variety of metrics. In another example, a link layer discovery protocol (LLDP) is used by network switches 104A-N to advertise their identity, capabilities, and neighbors on an Ethernet local area network (LAN). LLDP can be used to assemble the network topology map. In yet another example, network load balancing module 114 determines the network traffic at each network switch 104A-N by obtaining central processing unit (CPU) load, memory load, backplane bandwidth or network switch fabric speed of network switches 104A-N using API 116 and then determines the network traffic at network switches 104A-N using the obtained CPU load, memory load, backplane bandwidth or network switch fabric speed. For example, the backplane is implemented using logic circuits to move frames between network ports.

Further in operation, network load balancing module 114 determines network switches having network load above the threshold value based on the network traffic at the network switches. In the example shown in FIG. 1, network load balancing module 114 determines network switches 104A, 104D, and 104F that are having network load above the threshold value. Furthermore, network load balancing module 114 reduces the network load at network switches 104A, 104D and 104F by dynamically instructing virtual switches associated with one or more host computing systems coupled to each network switch 104A, 104D and 104F and/or dynamically initiating migration (e.g., live migration) of one or more VMs running on one or more host computing systems coupled to each network switch 104A, 104D and 104F to other host computing systems coupled to other network switches based on the network topology map and network traffic at the other network switches.

Figure 2:
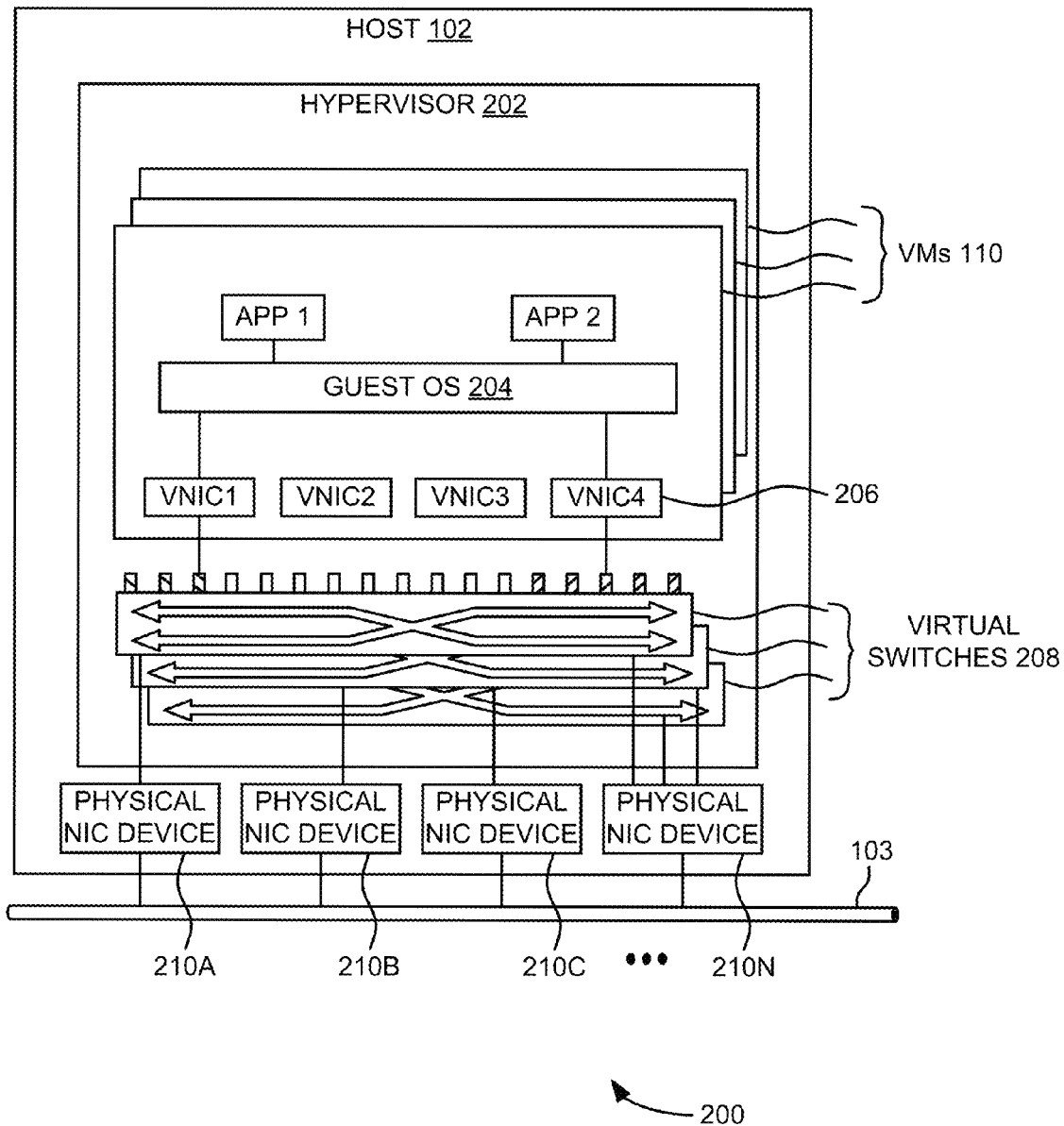
FIG. 2 depicts an example host computing system architecture in which embodiments herein may be practiced.

Referring to FIG. 2, which is architecture 200 of host computing system 102, such as host computing systems 102A-N shown in FIG. 1, in which embodiments herein may be practiced. Host computing system 102 includes hypervisor 202 (i.e., a virtualization layer) that manages assignment of physical host computing system resources to guest operating systems (GOSs) 204. VMs 110 include GOSs 204 executing applications (e.g., APP 1 and APP 2) and multiple virtual network interface cards (VNICs) 206. VNICs 206 are connected to associated virtual switches 208 that provide network switch functionality for the network interfaces. Virtual switches 208 are connected to physical NIC devices 210A-N in host computing system 102 to connect VMs 110 to network fabric 103. In the example shown in FIG. 1, network fabric 103 includes various network switches (e.g., 104A-N and 106A-N) and their connections. Each of physical NIC devices 210A-N is connected to a different network switch (e.g., network switches 104A-N of FIG. 1). In other words, if host computing system 102 includes two or more physical NIC devices, then host computing system 102 can connect to two or more network switches and if host computing system 102 includes one physical NIC device, then host computing system 102 can only connect to one network switch. Note that NICs having multiple ports are known in the art. A similar configuration implemented with multi-port NICs may have two or more ports of a single NIC connected to different network switches.

In one exemplary implementation, if host computing system 102 is coupled to two or more network switches, then network load balancing module 114 instructs one or more of the virtual switches 208 to route at least a part of the network traffic at the network switch through other network switches, as described in more detail with reference to FIG. 3. In another exemplary implementation, if host computing system 102 is coupled to only one network switch, then one or more of VMs 110 running on host computing system 102 are migrated to other host computing systems, as described in more detail with reference to FIG. 4.

Figure 3:
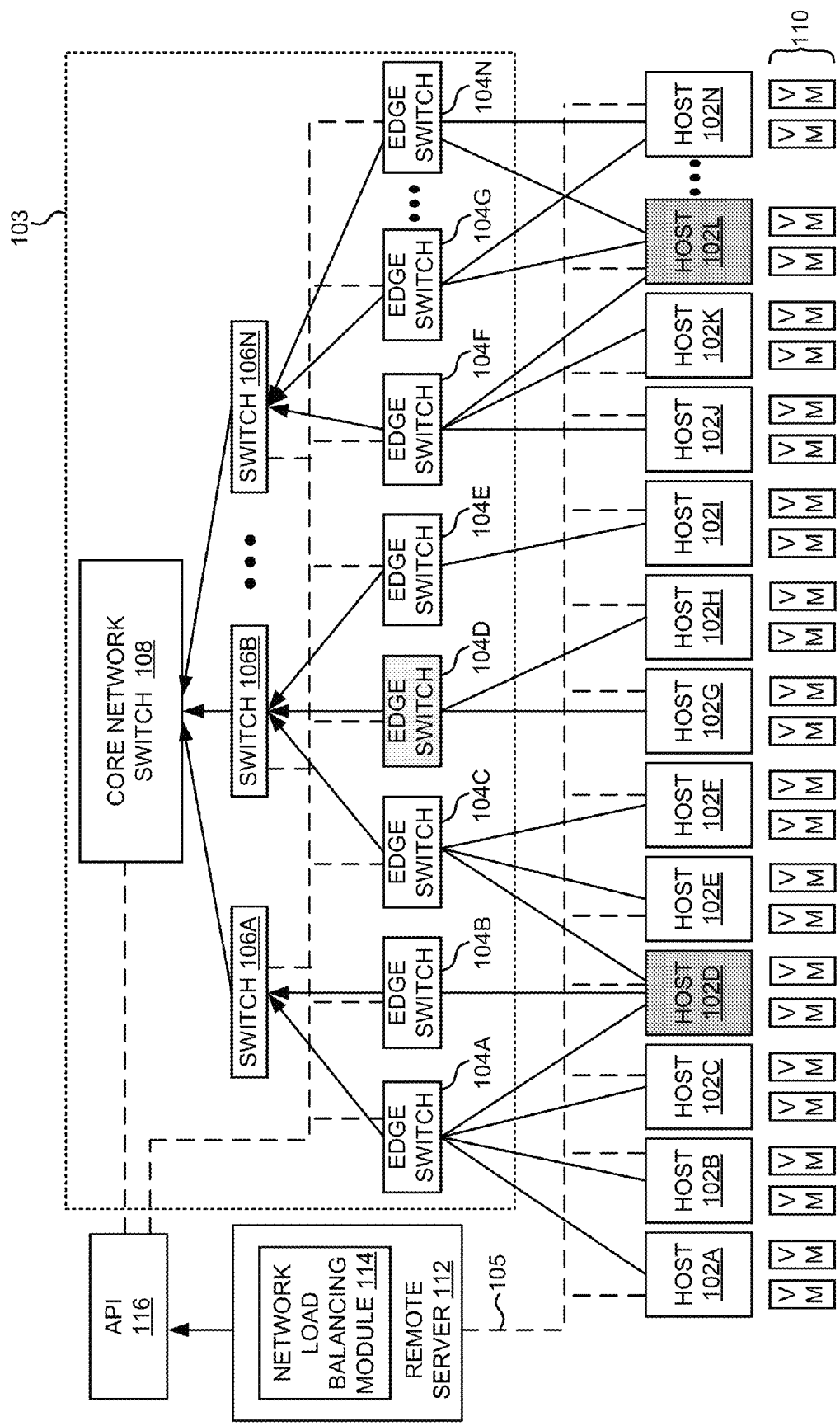
FIG. 3 is an example system view of the virtualized computing environment illustrating network load balancing by instructing virtual switches to route at least a part of the network traffic through other network switches.

FIG. 3 is an example system view 300 of the virtualized computing environment illustrating network load balancing by instructing virtual switches to route at least the part of the network traffic through other network switches. In the example shown in FIG. 3, network load balancing module 114 identifies host computing systems 102D, 102G, 102H, and 102L that are coupled to respective network switches 104A, 104D and 104F. In this case, host computing systems 102D, 102G, 102H, and 102L execute workloads (e.g., VMs 110) that transmit and receive network traffic via respective network switches 104A, 104D and 104F.

Further, network load balancing module 114 determines whether host computing systems 102D, 102G, 102H, and 102L are coupled to any other network switch using the network topology map. In the example shown in FIG. 3, host computing systems 102G and 102H are not coupled to any other network switch, host computing system 102D is also coupled to network switches 104B and 104C, and host computing system 102L is also coupled to network switches 104G and 104N. Therefore, network load balancing module 114 instructs one or more of the virtual switches associated with host computing systems 102D and 102L to route the part of the network traffic to other network switches based on the network traffic at the other network switches. Thus, the network load at network switches 104A and 104F is reduced.

In the example shown in FIG. 3, one or more of the virtual switches associated with host computing system 102D are connected to different physical NIC ports which are connected to network switches 104B and 104C. In other words, some of the traffic associated with host computing system 102D is routed through network switches 104B and/or 104C based on the network traffic at network switches 104B and 104C. In one embodiment, network load balancing module 114 determines the network traffic at network switches 104B and 104C and then selects the underutilized network switch (i.e., a network switch having available capacity) to route the part of the network traffic associated with host computing system 102D.

In addition, network load balancing module 114 initiates migration of one or more of VMs 110 running on one or more of host computing systems 102G and 102H (i.e., coupled only to network switch 104D) to other host computing systems coupled to other network switches to reduce the network load at network switch 104D, which is explained in more detail with reference to FIG. 4.

Figure 4:
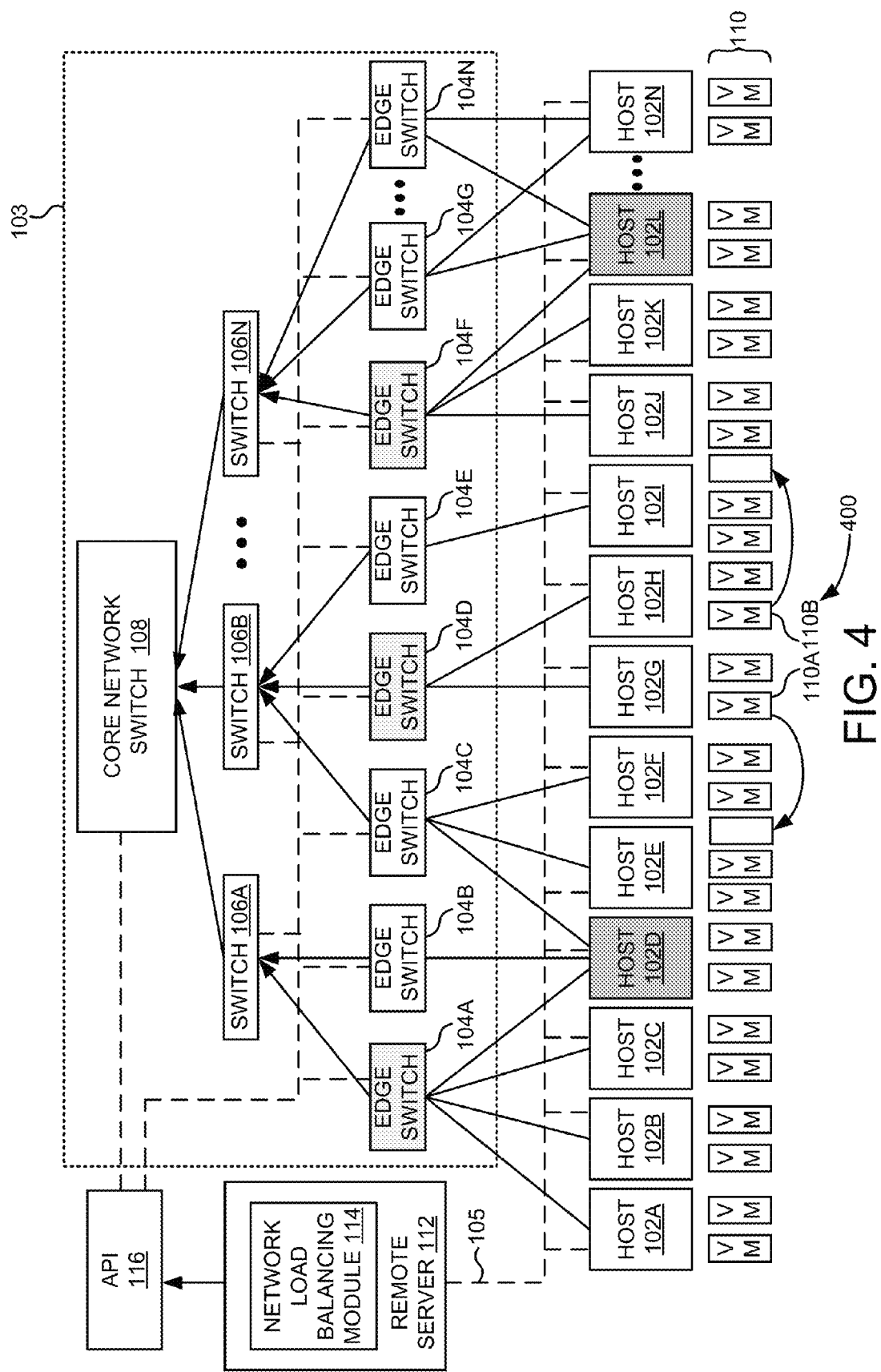
FIG. 4 is an example system view of the virtualized computing environment illustrating network load balancing by initiating migration of VMs to other host computing systems coupled to other network switches.

FIG. 4 is an example system view 400 of the virtualized computing environment illustrating network load balancing by initiating migration of VMs 110 to other host computing systems coupled to other network switches. In the example shown in FIG. 4, network load balancing module 114 reduces the network load at network switch 104D by initiating migration (e.g., live migration) of VMs 110A and 110B running on host computing systems 102G and 102H (e.g., having single connection with network switch 104D) to host computing systems 102E and 102I, respectively. Further, host computing systems 102E and 102I are selected to migrate VM 110A and VM 110B based on the network traffic at network switches 104B, 104C, 104E and 104G-N. In this case, network load balancing module 114 determines the network traffic at network switches 104B, 104C, 104E and 104G-N and then selects underutilized network switches (i.e., the network switches having minimum network traffic) to initiate migration of VM 110A and VM 110B to host computing systems 102E and 102I that are coupled to the underutilized network switches.

Further, a resource scheduling framework migrates VM 110A and VM 110B running on host computing systems 102G and 102H based on availability of computing resources (e.g., central processing unit (CPU) and memory) at destination host computing systems 102E and 102I. For example, the resource scheduling framework manages allocation and deallocation of computing resources to the VMs.

Further, the network load balancing module 114 determines whether the network load at network switches 104A, 104D and 104F is still above the threshold value after routing the part of the network traffic passing through the network switches 104A, 104D and 104F. If the network load at any of network switches 104A, 104D and 104F is still above the threshold value, then network load balancing module 114 repeats the process described in FIGS. 3 and 4 for next host computing systems until the network load at network switches 104A, 104D and 104F falls below the threshold value.

Figure 5:
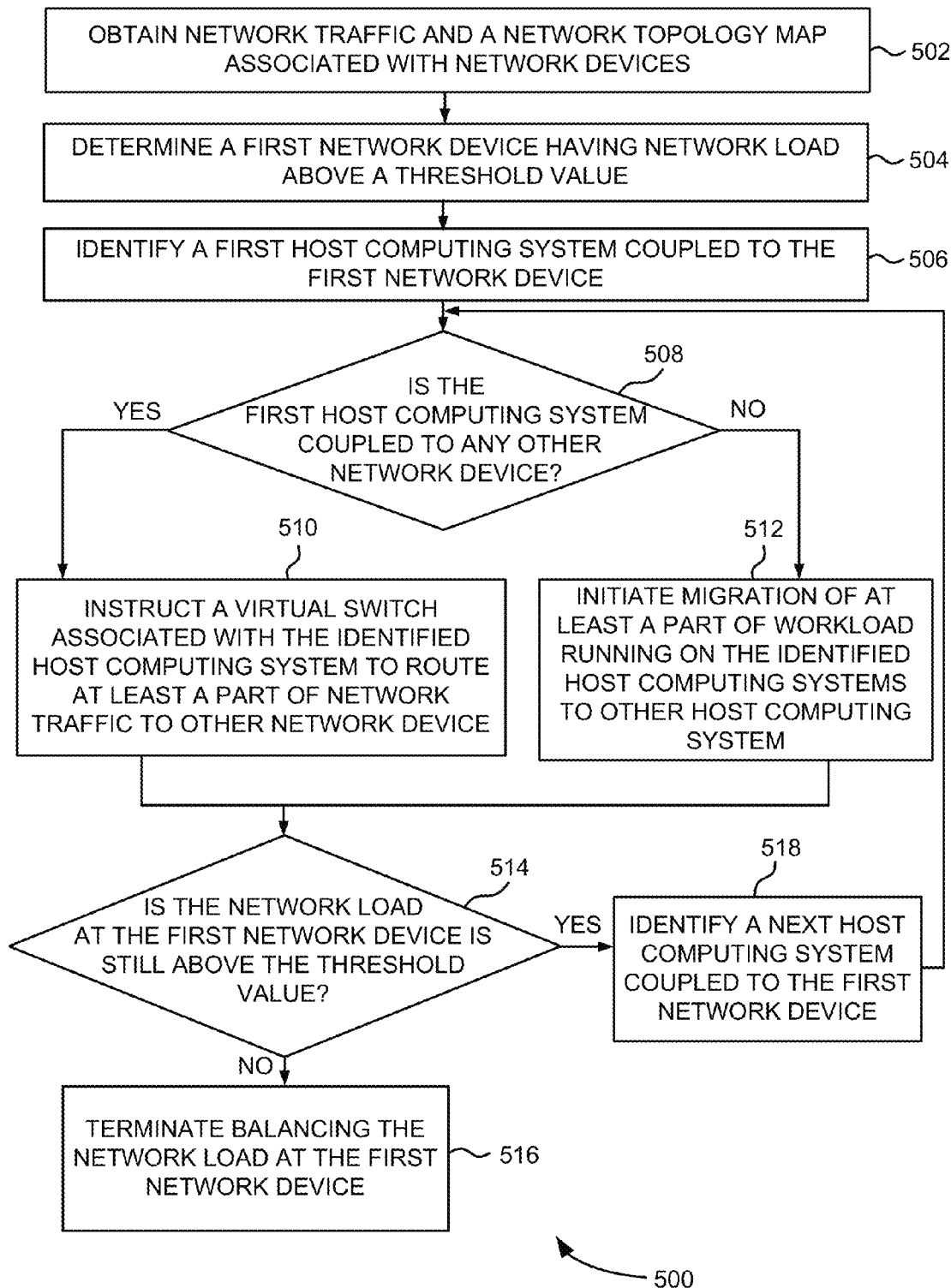
FIG. 5 is a flow diagram of an example method for balancing network load at network devices in a virtualized computing environment.

FIG. 5 is a flow diagram 500 of an example method for balancing network load at network devices in a virtualized computing environment. In one example, the virtualized computing environment includes host computing systems. Further, each host computing system has workload (e.g., VMs) running therein and each host computing system is coupled to one or more network devices. For example, the network device refers to any device capable of routing/clearing the network traffic such as routers, switches, home gateway router, modem racks and so on.

At block 502, network traffic and a network topology map associated with the network devices are obtained. In an example, the network traffic and the network topology map associated with the network devices are obtained using an API as described above in more detail with reference to FIG. 1. One skilled in the art can envision that any other interfaces, protocols, and mechanisms can also be used for discovering network topology maps and monitoring network statistics. The network topology map refers to a map showing the relationship between the network devices, host computing systems and workloads in the virtualized computing environment. The network traffic is the traffic that is transmitted and received via the network devices.

At block 504, a first network device having network load above a threshold value is determined. At block 506, a first host computing system coupled to the first network device is identified (e.g., using the network topology map). In this case, the first host computing system executes a workload that transmits and receives network traffic via the first network device. At block 508, a check is made to determine whether the first host computing system is coupled to any other network device. At block 510, if the first host computing system is not coupled to any other network device, the network load at the first network device is reduced by initiating migration (e.g., live migration) of at least a part of the workload (e.g., at least one VM) to a second host computing system coupled to any other network device. A resource scheduling framework selects the second host computing system based on network traffic at the other network device and availability of computing resources (e.g., CPU and memory) at the second host computing system. In other words, an underutilized network device is determined from the other network devices to initiate migration of VMs to host computing systems that are coupled to the underutilized network device.

At block 512, if the first host computing system is coupled to a second network device, the network load at the first network device is reduced by instructing a virtual switch of the first host computing system to route at least a part of the network traffic between the workload and the second network device. The resource scheduling framework manages selection of the second network device based on the network traffic. For example, if the first host computing system is coupled to a second network device and a third network device, then the network load at the first network device is reduced by instructing the virtual switch of the first host computing system to route the part of the network traffic between the workload and one of the second and third network devices based on the network traffic at the second and third network devices. In other words, an underutilized network device (i.e., the network device having minimum network traffic) between the second and third network devices is selected to route some of the network traffic associated with the first host computing system.

At block 514, a check is made to determine whether the network load at the first network device is still above the threshold value. If the network load at the first network device is still above the threshold value, then the steps from 508-512 are repeated for other host computing systems coupled to the first network device until the network load at the first network device falls below the threshold value. At block 516, if the network load at the first network device is below the threshold value, balancing the network load at the first network device is terminated.

In various embodiments, the systems and methods described in FIGS. 1 through 5 propose a technique to balance the network load at the network switch by instructing the virtual switch to route at least the part of network traffic between the workload and other network device and/or initiating migration of at least the part of workload to other host computing system coupled to other network device. Using this technique, the network load at the network device is balanced without disconnecting any host computing systems or any other resources coupled to the network device. Therefore, there is no downtime of the VMs running on the host computing systems except for the very brief pause incurred by live migration. Also, the systems and methods described in FIGS. 1-5 can be applied to any network switch (e.g., edge switches 104A-N, switches 106A-N, and so on).

Figure 6:
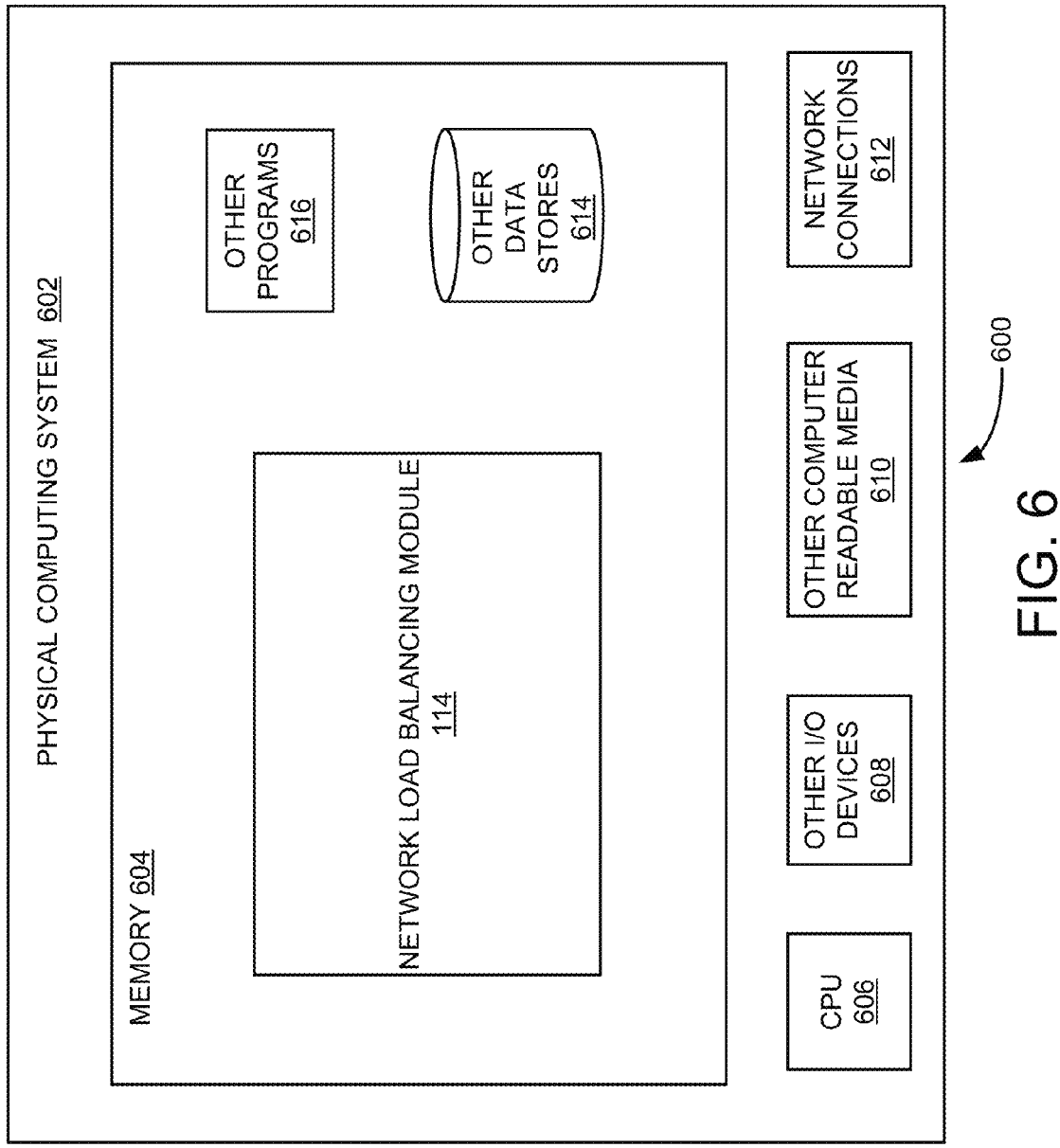
FIG. 6 is a block diagram of an example physical computing system for implementing the network load balancing module, such as the one shown in FIGS. 1, 3 and 4.

FIG. 6 is a block diagram 600 of an example physical computing system 602 for implementing a network load balancing module, such as the one shown in FIGS. 1, 3 and 4. In particular, FIG. 6 shows the physical computing system 602 (e.g., remote server 112 as shown in FIGS. 1, 3, and 4) that may be utilized to implement network load balancing module 114.

Note that one or more general purpose virtual or physical computer systems suitably instructed may be used to implement network load balancing module 114. In addition, the physical computing system 602 may comprise one or more distinct computing systems/devices and may span distributed locations. Furthermore, each block shown may represent one or more such blocks as appropriate to a specific embodiment or may be combined with other blocks. Also, network load balancing module 114 may be implemented in software, hardware, firmware, or in some combination to achieve the capabilities described herein.

In the embodiment shown, the physical computing system 602 may comprise a computer memory ("memory") 604, one or more CPUs 606, input/output devices 608 (e.g., keyboard, mouse, etc.), other computer-readable media 610, and network connections 612. Network load balancing module 114 is shown residing in the memory 604. Network load balancing module 114 may execute on one or more CPUs 606 and implement techniques described herein. Other code or programs 616 (e.g., an administrative interface, a Web server, and the like) and potentially other data repositories, such as data store 614, may also reside in the memory 604, and execute on one or more CPUs 606. One or more of the components in FIG. 6 may not be present in any specific implementation. For example, some embodiments may not provide other computer readable media 610. Further, some embodiments may provide a display in the physical computing system 602.

Network load balancing module 114 interacts via a network with host computing systems. The network may be any combination of media (e.g., twisted pair, coaxial, fiber optic, radio frequency), hardware (e.g., routers, switches, repeaters, transceivers), and protocols (e.g., transmission control protocol/Internet protocol (TCP/IP), user datagram protocol (UDP), Ethernet, Wi-Fi, worldwide interoperability for microwave access (WiMAX)) that facilitate communication to and from remotely situated humans and/or devices.

As discussed, network load balancing module 114 balances network load at the network switches by dynamically instructing a virtual switch associated with the identified host computing system to route at least a part of the network traffic between the workload and the other network switch and/or dynamically initiating migration (e.g., live migration) of at least a part of the workload to other host computing system coupled to the other network switch based on a network topology map and network traffic at the other network switches.

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of network load balancing module 114, such as in the data store 614, can be available by standard mechanisms such as through C, C++, C#, and Java APIs, libraries for accessing files, databases, or other data repositories, through scripting languages such as extensible mark up language (XML), or through Web servers, file transfer protocol (FTP) servers, or other types of servers providing access to stored data. The data store 614 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, WebSockets, hyper text transfer protocol (HTTP), web services (XML-based remote procedure call (XML-RPC), Java API for XML-based remote procedure call (JAX-RPC), simple object access protocol (SOAP), and the like). Other variations are possible. Also, other functionality could be provided by each component/module, or existing functionality could be distributed amongst the components/modules in different ways, yet still achieve the functions described herein.

Furthermore, in some embodiments, some or all of the components of network load balancing module 114 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of this disclosure. For example, the methods, techniques, and systems for network load balancing in the virtualized computing environment are applicable to other architectures or in other settings. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. An automated method for balancing network load at network devices in a virtualized computing environment comprising:
   determining a first network device of a plurality of network devices having network load above a threshold value, wherein the plurality of network devices routes or carries network traffic to and from a plurality of host computing systems;
   identifying a first host computing system coupled to the first network device from the plurality of host computing systems, the first host computing system executing a workload that transmits and receives network traffic via the first network device;
   if the first host computing system is not coupled to any other network device, reducing the network load at the first network device by initiating migration of at least a part of the workload to a second host computing system coupled to any other network device; and
   if the first host computing system is coupled to a second network device, reducing the network load at the first network device by instructing a virtual switch of the first host computing system to route at least a part of the network traffic between the workload and the second network device.

2. The method of claim 1, further comprising:
   determining whether the network load at the first network device is still above the threshold value; and
   if so, repeating the steps of identifying, initiating migration, and instructing a virtual switch for other host computing systems coupled to the first network device until the network load at the first network device is less than the threshold value.

3. The method of claim 2, further comprising:
   if not, terminating balancing the network load at the first network device.

4. The method of claim 1, wherein, in instructing the virtual switch to route at least the part of the network traffic between the workload and the second network device, the second network device is selected based on network traffic at the second network device.

5. The method of claim 4, wherein the second network device is selected using a resource scheduling framework.

6. The method of claim 1, wherein, in initiating the migration of at least the part of the workload to the second host computing system, the second host computing system is selected based on network traffic at the other network device.

7. The method of claim 6, wherein the second host computing system is selected using a resource scheduling framework.

8. The method of claim 1, wherein the plurality of network devices comprise one of routers, switches, multi-function devices having a routing function, and edge gateways.

9. A system comprising:
   a plurality of network devices;
   a plurality of host computing systems, wherein the plurality of network devices routes or carries network traffic to and from the plurality of host computing systems; and
   a remote server comprising a network load balancing module to automatically balance network load at the plurality of network devices in a virtualized computing environment, by:
      determining a first network device of the plurality of network devices having network load above a threshold value;
      identifying a first host computing system coupled to the first network device from the plurality of host computing systems, the first host computing system executing a workload that transmits and receives network traffic via the first network device;
      if the first host computing system is not coupled to any other network device, reducing the network load at the first network device by initiating migration of at least a part of the workload to a second host computing system coupled to any other network device; and
      if the first host computing system is coupled to a second network device, reducing the network load at the first network device by instructing a virtual switch of the first host computing system to route at least a part of the network traffic between the workload and the second network device.

10. The system of claim 9, wherein the network load balancing module is further configured to:

determine whether the network load at the first network device is still above the threshold value; and if so, repeat the steps of identifying, initiating migration, and instructing virtual switch for other host computing systems coupled to the first network device until the network load at the first network device is less than the threshold value.

11. The system of claim 10, wherein the network load balancing module is further configured to:

if not, terminate balancing the network load at the first network device.

12. The system of claim 9, wherein the network load balancing module instructs the virtual switch to route at least the part of the network traffic between the workload and the second network device based on network traffic at the second network device.

13. The system of claim 12, wherein the second network device is selected using a resource scheduling framework.

14. The system of claim 9, wherein the network load balancing module initiates the migration of at least the part of the workload to the second host computing system based on network traffic at the other network device.

15. The system of claim 14, wherein the second host computing system is selected using a resource scheduling framework.

16. A computer-readable storage medium including instructions that are configured, when executed by a computing device, to perform an automated method for balancing network load at network devices in a virtualized computing environment comprising:

determining a first network device of a plurality of network devices having network load above a threshold value, wherein the plurality of network devices routes or carries network traffic to and from a plurality of host computing systems;

identifying a first host computing system coupled to the first network device from the plurality of host computing systems, the first host computing system executing a workload that transmits and receives network traffic via the first network device;

if the first host computing system is not coupled to any other network device, reducing the network load at the first network device by initiating migration of at least a part of the workload to a second host computing system coupled to any other network device; and if the first host computing system is coupled to a second network device, reducing the network load at the first network device by instructing a virtual switch of the first host computing system to route at least a part of the network traffic between the workload and the second network device.

17. The computer-readable storage medium of claim 16, further comprising:

determining whether the network load at the first network device is still above the threshold value; and if so, repeating the steps of identifying, initiating migration, and instructing a virtual switch for other host computing systems coupled to the first network device until the network load at the first network device is less than the threshold value.

18. The computer-readable storage medium of claim 17, further comprising:

if not, terminating balancing the network load at the first network device.

19. The computer-readable storage medium of claim 16, wherein, in instructing the virtual switch to route at least the part of the network traffic between the workload and the second network device, the second network device is selected based on network traffic at the second network device.

20. The computer-readable storage medium of claim 19, wherein the second network device is selected using a resource scheduling framework.

21. The computer-readable storage medium of claim 16, wherein, in initiating the migration of at least the part of the workload to the second host computing system, the second host computing system is selected based on network traffic at the other network device.

22. The computer-readable storage medium of claim 21, wherein the second host computing system is selected using a resource scheduling framework.

* * * * *